(12) United States Patent
Dyck et al.

(10) Patent No.: US 11,428,314 B2
(45) Date of Patent: Aug. 30, 2022

(54) HYDROSTATIC DRIVE SYSTEM WITH VARIABLE VIBRATION DAMPER

(71) Applicant: Kinetics Drive Solutions Inc., Langley (CA)

(72) Inventors: Gerald Dyck, Abbotsford (CA); Paul Dries, Coquitlam (CA); Ron Scheper, Abbotsford (CA); Benjamin Starkey, Abbotsford (CA); John Czepak, Langley (CA)

(73) Assignee: KINETICS DRIVE SOLUTIONS INC., Langley (CA)

( * ) Notice: Subject to any disclaimer, the term of this patent is extended or adjusted under 35 U.S.C. 154(b) by 643 days.

(21) Appl. No.: 16/470,419

(22) PCT Filed: Dec. 18, 2017

(86) PCT No.: PCT/CA2017/051525
§ 371 (c)(1),
(2) Date: Jun. 17, 2019

(87) PCT Pub. No.: WO2018/112608
PCT Pub. Date: Jun. 28, 2018

(65) Prior Publication Data
US 2020/0011415 A1 Jan. 9, 2020

Related U.S. Application Data

(60) Provisional application No. 62/436,617, filed on Dec. 20, 2016.

(51) Int. Cl.
*F16H 61/4183* (2010.01)
*F16F 9/50* (2006.01)
*F16H 57/028* (2012.01)

(52) U.S. Cl.
CPC ........... *F16H 61/4183* (2013.01); *F16F 9/50* (2013.01); *F16H 57/028* (2013.01)

(58) Field of Classification Search
CPC .................................................. F16H 61/4183
See application file for complete search history.

(56) References Cited

U.S. PATENT DOCUMENTS 3,884,095 A 5/1975 Miyao et al.
5,020,826 A 6/1991 Stecklein et al.
(Continued)

FOREIGN PATENT DOCUMENTS

EP 1001194 A2 5/2000
EP 2851586 A1 3/2015
(Continued)

OTHER PUBLICATIONS

International Search Report and Written Opinion for PCT/CA2017/051525 dated Mar. 12, 2018 in 9 pages.

*Primary Examiner* — Michael Leslie
(74) *Attorney, Agent, or Firm* — Cozen O'Connor

(57) ABSTRACT

A hydrostatic drive system is disclosed which allows for simpler and more robust control of hydraulic vibration. The system comprises first and second hydraulic drive units and a variable damping device. At least the first hydraulic drive unit is a variable displacement type and comprises a displacement control. The variable damping device comprises at least one variable element. The system comprises a first linkage apparatus between the displacement control and the variable element and is operable to control the variable element in accordance with the displacement of the displacement control.

24 Claims, 10 Drawing Sheets

(56) References Cited

U.S. PATENT DOCUMENTS

| | | | | |
|---|---|---|---|---|
| 5,259,738 | A * | 11/1993 | Salter | F04B 49/065 |
| | | | | 417/270 |
| 6,234,758 | B1 | 5/2001 | Pawelski | |
| 6,578,450 | B1 | 6/2003 | Prebeck et al. | |
| 7,374,005 | B2 | 5/2008 | Gray | |
| 8,240,145 | B2 * | 8/2012 | Dyck | F16H 61/433 |
| | | | | 92/56 |
| 8,281,892 | B2 | 10/2012 | Sugimoto et al. | |
| 8,366,407 | B2 * | 2/2013 | Hayashi | F04B 49/225 |
| | | | | 417/295 |
| 8,418,797 | B2 * | 4/2013 | Matsumoto | E02F 9/2296 |
| | | | | 180/197 |
| 9,567,996 | B2 * | 2/2017 | Chatfield | F04B 39/0055 |
| 10,024,426 | B2 * | 7/2018 | Ratzke | F16H 39/02 |
| 2011/0048829 | A1 | 3/2011 | Matsumoto et al. | |
| 2014/0138958 | A1 | 5/2014 | Verdegem | |
| 2015/0377350 | A1 | 12/2015 | Ratzke et al. | |

FOREIGN PATENT DOCUMENTS

| | | |
|---|---|---|
| JP | H0466454 U | 6/1992 |
| JP | 2986278 B2 | 12/1999 |

* cited by examiner

HYDROSTATIC DRIVE SYSTEM WITH VARIABLE VIBRATION DAMPER

TECHNICAL FIELD

The present invention pertains to hydrostatic drive systems and vibration control thereof.

BACKGROUND

Modern hydrostatic drive systems typically consist of at least 2 hydraulic drive units fluidly coupled to each other. One hydraulic drive unit may function as the pump and the other as the motor, or vice versa. When at least one of hydraulic drive units is a variable unit, a continuously variable transmission or CVT is created. Further, a hydrostatic drive system can also function as the variator in a power split, infinitely variable transmission or IVT such as disclosed in U.S. Pat. No. 7,357,744. Positive displacement hydraulic drive units can be of vane, plunger, diaphragm or piston designs. One of the most common and most efficient is the bent axis piston hydraulic drive unit (pump or motor).

One of the unfortunate aspects of most positive displacement hydraulic drive units is that a number of chambers must open and close during each revolution of the drive shaft, thereby creating pressure and flow pulses in the hydraulic lines. Depending on the particular implementation, the level of resulting fluid-born and structure-born vibration can be quite significant. Various methods may be employed to reduce vibration transmitted to the surrounding components. Physically isolating the hydrostatic drive with special dampers in the structural mounts and drive shafts is one option but this can create integration and packaging problems. A more efficient method is to treat the cause of the vibration closer to the source, i.e. reduce the level of pressure pulsations in the hydraulic lines. Typical damping devices include the Helmholtz or side-branch resonator, concentric chamber resonator, or ripple chamber. Parker Hannifin's Pulse-Tone™ and Linde Hydraulics' SPU Silencer damping devices are practical examples of some of these. There are also less common devices such as the Quincke Tube which setup destructive opposing waves reducing or eliminating the pulsation. When tuned properly, these can be very effective at reducing the amplitude of vibration. These devices must be tuned for certain frequency bands however which can be quite narrow. Thus, such devices are not completely effective in a drive system that has multiple resonating frequencies. Ideally, these devices should instead be "tuned on the fly" for varying operating conditions.

Variable damping devices for hydraulics are well known in the art. For instance, U.S. Pat. No. 6,234,758 teaches a pumping system with a variable side branch consisting of a resonating chamber having a movable piston forming one end of the chamber. Using various actuation methods the chamber volume may be altered by changing the position of the piston. In U.S. Pat. No. 6,234,758, a controller is connected to a speed sensor monitoring pump speed. The controller alters the chamber volume to attenuate the frequency response required for a particular pump speed. Although electronics have been successfully used in both stationary and mobile applications, they add cost to the system. Electronics, especially sensors, are not as robust as comparable mechanical systems.

In typical systems incorporating variable damping, speed is monitored in order to determine the attenuation frequency of the damping device. Most of these systems are used in purely hydrostatic (e.g. CVT) systems.

Although various means for vibration control are known for hydrostatic drive systems, there is a continuing need to provide for simpler and more robust designs and particularly for use in a wider variety of transmission applications such as IVTs. The present invention addresses these and other needs as described below.

SUMMARY

In an IVT, it has recently been found that the hydrostatic drive system behaves differently than in a CVT. Testing has indicated that many of the highest vibration levels can be correlated simply to the displacement of either the pump, the motor or a combination of the two. As mentioned above, once a mechanical mechanism is tailored to the required response curve, it becomes a very robust and reliable system. The invention presented here takes advantage of these findings and allows the use of a mechanical linkage or mechanism to vary the attenuation frequency of the damping device instead of electronics.

A hydrostatic drive system of the invention comprises first and second hydraulic drive units, first and second drive shafts connected to the first and second hydraulic drive units respectively, a first fluid line fluidly connecting the first hydraulic drive unit to the second hydraulic drive unit, a variable damping device connected to the first fluid line and fluidly connected to the first and second hydraulic drive units, and a first linkage apparatus. The first hydraulic drive unit is a variable displacement type of hydraulic drive unit comprising a first displacement control for controlling the displacement of the first hydraulic drive unit. The variable damping device comprises at least one variable element providing for variation in the attenuation frequency of the variable damping device. The first linkage apparatus is provided between the first displacement control of the first hydraulic drive unit and the variable element of the variable damping device and is operable to control the variable element in accordance with the displacement of the first displacement control.

In embodiments of the invention, the first hydraulic drive unit can be a pump and the second hydraulic drive system can be a motor. Or the function of the units can be reversed, namely the first hydraulic drive unit can be a motor and the second hydraulic drive system can be a pump.

The variable damping device employed can be a Helmholtz resonator. In such a case, the variable element for instance may be a piston forming an end of the Helmholtz resonator, whereby the volume of the Helmholtz resonator changes with the displacement of the piston. Alternatively, the variable element may be a variable length neck on the Helmholtz resonator, whereby the volume of the Helmholtz resonator changes with the displacement of the neck. The variable damping device may however be any suitable such device known in the art, including for instance a coaxial chamber resonator or a Quincke tube.

The first linkage apparatus employed in the hydrostatic drive system can desirably be a mechanical apparatus mechanically linking the first displacement control of the first hydraulic drive unit to the variable element of the variable damping device. In an embodiment in which the variable damping device is a Helmholtz resonator and the variable element is a piston forming an end of the Helmholtz resonator, an exemplary mechanical apparatus comprises a lever arm attached to the first displacement control of the first hydraulic drive unit, and a push-pull rod attached to the piston of the Helmholtz resonator. Further, the first hydraulic drive unit in such an embodiment may be a bent axis type of unit comprising either a yoke or a sector plate for operation and in which the lever arm is attached to either the yoke or the sector plate of the bent axis. Alternatively, the first hydraulic drive unit may be an axial piston type of unit in which the lever arm is attached to the swash plate of the unit. Further still, the first hydraulic drive unit may be a radial piston motor type of unit in which the lever arm is attached to the eccentric displacement control ring of the unit. In a like manner, the second hydraulic drive unit may also be any of the aforementioned types, e.g. a bent axis type, an axial piston type, a radial piston motor type, or other.

In embodiments in which the first linkage apparatus is a mechanical apparatus, the mechanical apparatus can comprise a multi-bar linkage, a cam mechanism, an eccentric mechanism or a screw mechanism. In embodiments in which the variable damping device is a Helmholtz resonator and the variable element is a variable length neck on the Helmholtz resonator, the mechanical apparatus can comprise a lever arm attached to the first displacement control of the first hydraulic drive unit, and a push-pull rod attached to the neck of the Helmholtz resonator.

The first linkage apparatus employed in the hydrostatic drive system can however be other than strictly a mechanical apparatus. For instance, the first linkage apparatus can comprise a position sensor attached to the first displacement control of the first hydraulic drive unit, an actuator connected to the variable element of the variable damping device, and a controller in which the controller input is connected to the position sensor and the controller output is connected to the actuator.

Other variants of the invention include hydrostatic drive systems in which the second hydraulic drive unit is also a variable displacement type of hydraulic drive unit comprising a second displacement control. In such a variant, the hydrostatic drive system can additionally comprise: a second linkage apparatus between the second displacement control of the second hydraulic drive unit and the variable element of the variable damping device and operable to control the variable element in accordance with the displacement of the second displacement control, and a summation device connected to the first and second linkage apparatus and operable to vary the effect of the first and second linkage apparatus on the variable element. Alternatively, in such a variant, the variable damping device can comprise an additional variable element providing for variation in the attenuation frequency of the variable damping device. The hydrostatic drive system can then additionally comprise a second linkage apparatus between the second displacement control of the second hydraulic drive unit and the additional variable element of the variable damping device. Such first and second linkage apparatuses may be interconnected. In yet other variants, the hydrostatic drive system may comprise a second fluid line fluidly connecting the first hydraulic drive unit to the second hydraulic drive unit.

Hydrostatic drive systems are particularly suited for use in power split, hydro mechanical infinitely variable transmissions and/or continuously variable transmissions.

The invention thus represents a robust method for attenuating vibration in a related hydrostatic drive system. Specifically, a method of the invention comprises: incorporating a first displacement control for controlling the displacement of the first hydraulic drive unit into the variable displacement first hydraulic drive unit, incorporating a first linkage apparatus between the first displacement control of the first hydraulic drive unit and the variable element of the variable damping device, and controlling the variable element in accordance with the displacement of the first displacement control.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

Herein, the term "continuously variable transmission", or CVT, refers to a transmission that can change steplessly through an infinite number of effective gear ratios between minimum and maximum ratios.

An "infinitely variable transmission", or IVT, is a sub class of CVT and refers to a transmission that that can change steplessly through an infinite number of effective gear ratios between minimum and maximum ratios with one of the ratios being an infinite input-to-output speed ratio.

A "hydraulic drive unit" refers to a hydraulic positive displacement pump or motor either of which may be of a fixed or variable displacement design. A "variable displacement type of hydraulic drive unit" refers to a hydraulic drive unit in which the amount of fluid displaced per revolution may be varied while the unit is running and in which the variable displacement is controlled by a "displacement control" of some kind which is a mechanism for controlling the displacement of the unit.

A "variator" is often used in an IVT to effect speed ratio and torque ratio changes in the transmission. It consists of at least two input/output shafts with variable speed and torques ratios between said shafts. It may be of mechanical, hydraulic or electrical design to effect the ratio changes.

A "hydraulic variator" is a sub class of variator and consists of at least two hydraulic drive units hydraulically coupled together. Either of the hydraulic drive units may be of a fixed or variable design. The input/output shafts of the hydraulic drive units form the input/output shafts of the variator. At any given time, at least one of the hydraulic drive units functions as a pump with the remaining units functioning as a motor.

A "split path IVT" is a sub class of IVT in which input power is split between 2 or more branches and recombined at the output of the IVT. Often, at least one of the branches consists of a variator. An example of a split path IVT is disclosed in U.S. Pat. No. 7,357,744.

Figure 1:
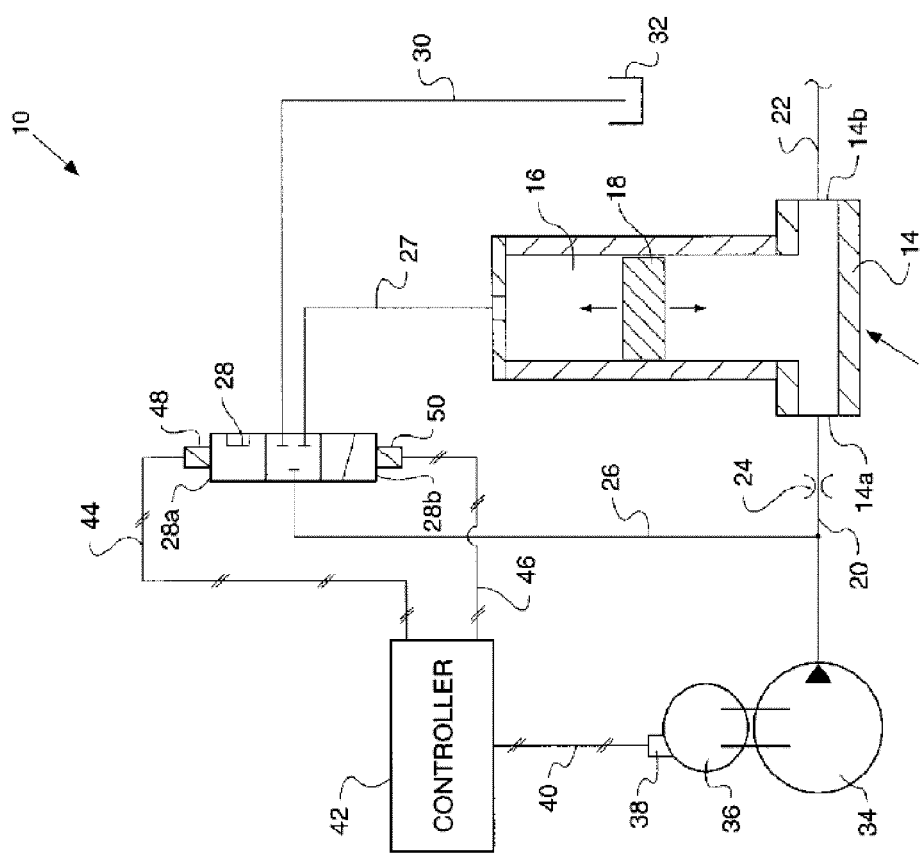
FIG. 1 is a diagrammatic illustration of a prior art hydraulic system (reproduced from the aforementioned U.S. Pat. No. 6,234,758).

Variable damping devices for hydraulics are well known in the art. For instance, FIG. 1 (reproduced from the aforementioned U.S. Pat. No. 6,234,758 of Caterpillar) illustrates a pumping system with a variable side branch consisting of a Helmholtz-type resonating chamber having a movable piston forming one end of the chamber. (In FIG. 1, the description of the various elements and the numbering thereof are the same as those used in U.S. Pat. No. 6,234,758.) As mentioned above, using various actuation methods, the chamber volume may be altered by changing the position of the piston. A controller is connected to a speed sensor indirectly monitoring pump speed through the driving electric motor. The controller alters the chamber volume to attenuate the frequency response required for a particular pump speed.

Electronics add cost to the system and further electronics, especially sensors, are not as robust as comparable mechanical systems. Harsh operating environments such as those found in mobile commercial and military applications can make it costly to integrate electrical devices that are robust enough to survive these environments.

Figure 2:
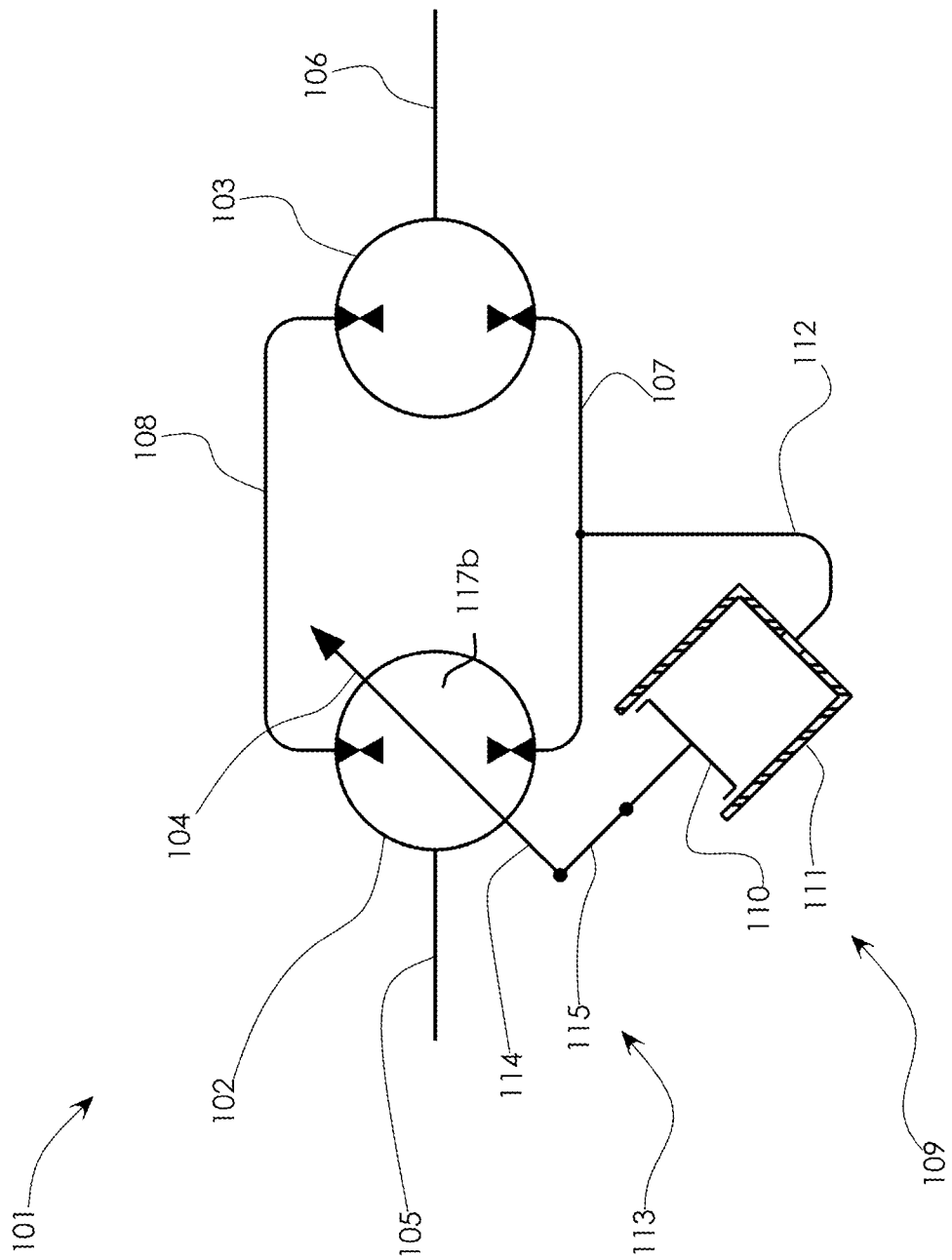
FIG. 2 is a schematic of a hydrostatic drive system of the invention in which the variable damping device is a Helmholtz resonator.
Figure 3:
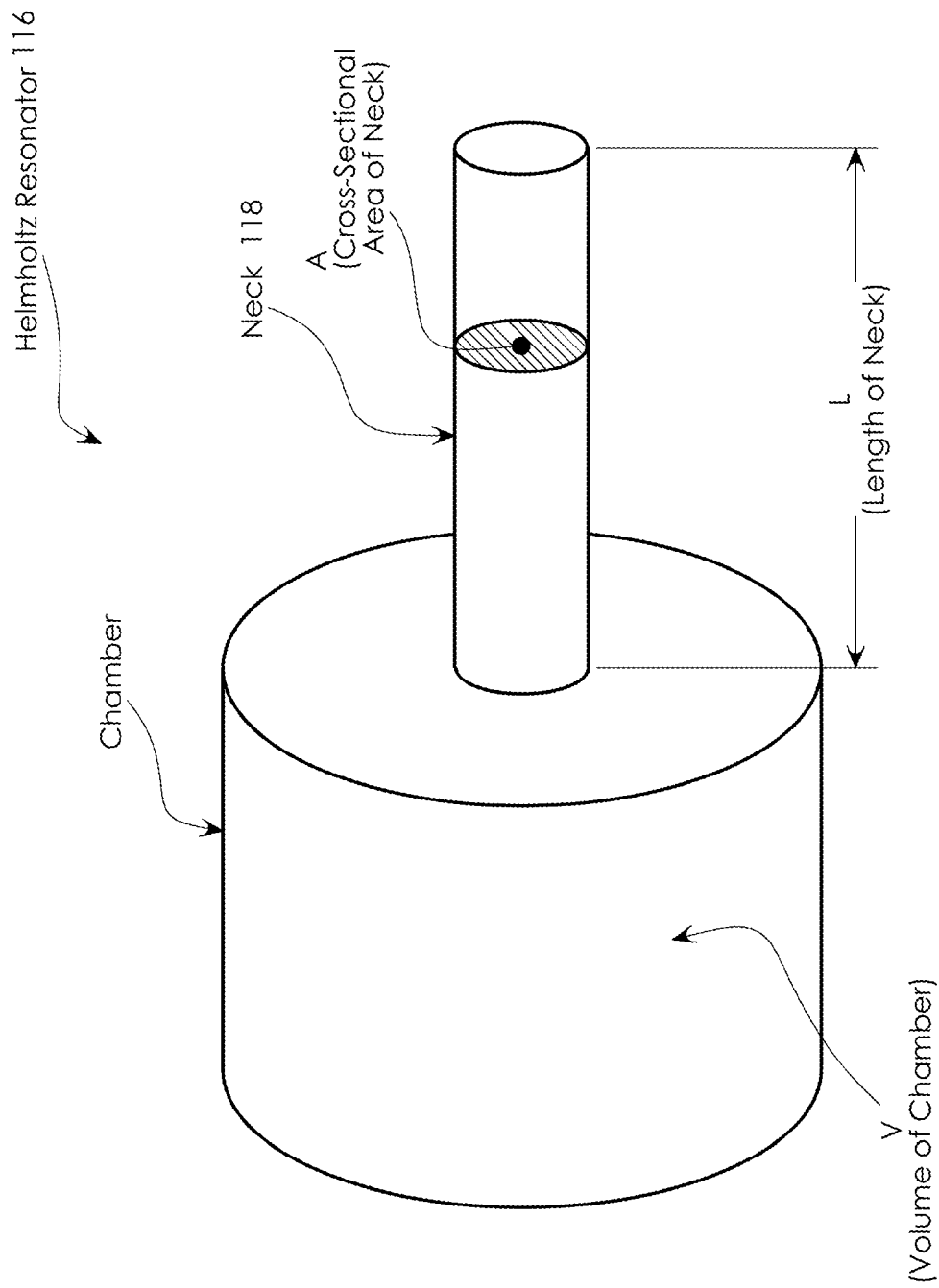
FIG. 3 shows a diagram of a Helmholtz resonator and illustrates the relationship between the frequency of the Helmholtz resonator (f) and its physical dimensions.
Figure 10:
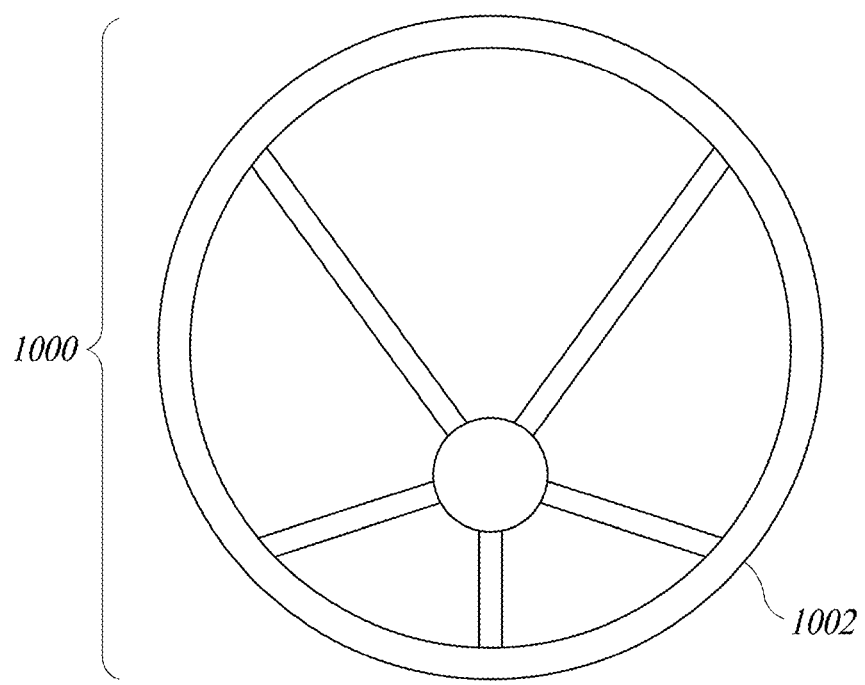
FIG. 10 shows a schematic diagram of a radial piston motor with an eccentric displacement control ring of an embodiment of the hydrostatic drive system of the invention.

FIG. 2 shows a schematic of an exemplary hydrostatic drive system (or variator) of the invention in which the variable damping device is a Helmholtz resonator. Such a drive system is particularly suitable for use in a split path IVT. Hydrostatic drive system 101 in FIG. 2 has first and second hydraulic drive units, 102 and 103 respectively. First hydraulic drive unit 102 is a variable displacement type of hydraulic drive unit comprising first displacement control 104 for controlling the displacement of the unit. The type of second hydraulic drive unit 103 is not specified as it may be any suitable type, including a variable displacement type. The system also has first and second drive shafts, 105 and 106 respectively, connected to first and second hydraulic drive units 102, 103 respectively. Further, the system is of a closed loop design having first fluid line 107 fluidly connecting first hydraulic drive unit 102 to second hydraulic drive unit 103, and second fluid line 108 fluidly connecting first hydraulic drive unit 102 to second hydraulic drive unit 103. (In a simpler embodiment, the system may be of an open loop design i.e. second fluid line 108 may not be present and first and second hydraulic drive units 102, 103 are connected to a reservoir system.) In order to damp vibration, the system includes variable damping device 109 in first fluid line 107 and is fluidly connected to first and second hydraulic drive units 102, 103. Variable damping device 109 comprises at least one variable element which provides for variation in the attenuation frequency of variable damping device 109. In FIG. 2, variable damping device 109 is shown as a Helmholtz resonator and the variable element is piston 110 forming one end of the resonator. Chamber 111 forms the other end of the resonator and the resonator is fluidly connected by damper fluid line 112 to first fluid line 107. As the displacement of the variable first hydraulic drive unit 102 changes, so does the volume of the resonator. As is known in the art, the frequency of the Helmholtz resonator is proportional to the volume of the chamber. (FIG. 3 for instance shows a diagram of a Helmholtz resonator 116 and qualitatively notes that the frequency of the Helmholtz resonator 116 is a function of its physical dimensions, including volume V, length of neck L and cross-sectional area of neck A.) Hydrostatic drive system 101 in FIG. 2 employs a simple mechanical linkage apparatus 113 which is connected to variable first hydraulic drive unit 102 in such a way that it follows the displacement of the unit. Specifically here, lever arm 114 is attached to displacement control 104 of unit 102. Depending on the type of unit and the displacement control used, what the lever arm is attached to might be the yoke 117a (FIG. 4) or sector plate 117b (FIG. 2) of a bent axis hydrostatic unit, the swash plate of an axial piston hydrostatic unit, the eccentric displacement control ring 1002 of a radial piston motor 1000 (FIG. 10), and so on. The other end of linkage apparatus 113 in FIG. 2 is connected, via push-pull rod 115, to the variable element of variable damping device 109, which as shown here is piston 110 in the Helmholtz resonator.

Figure 4:
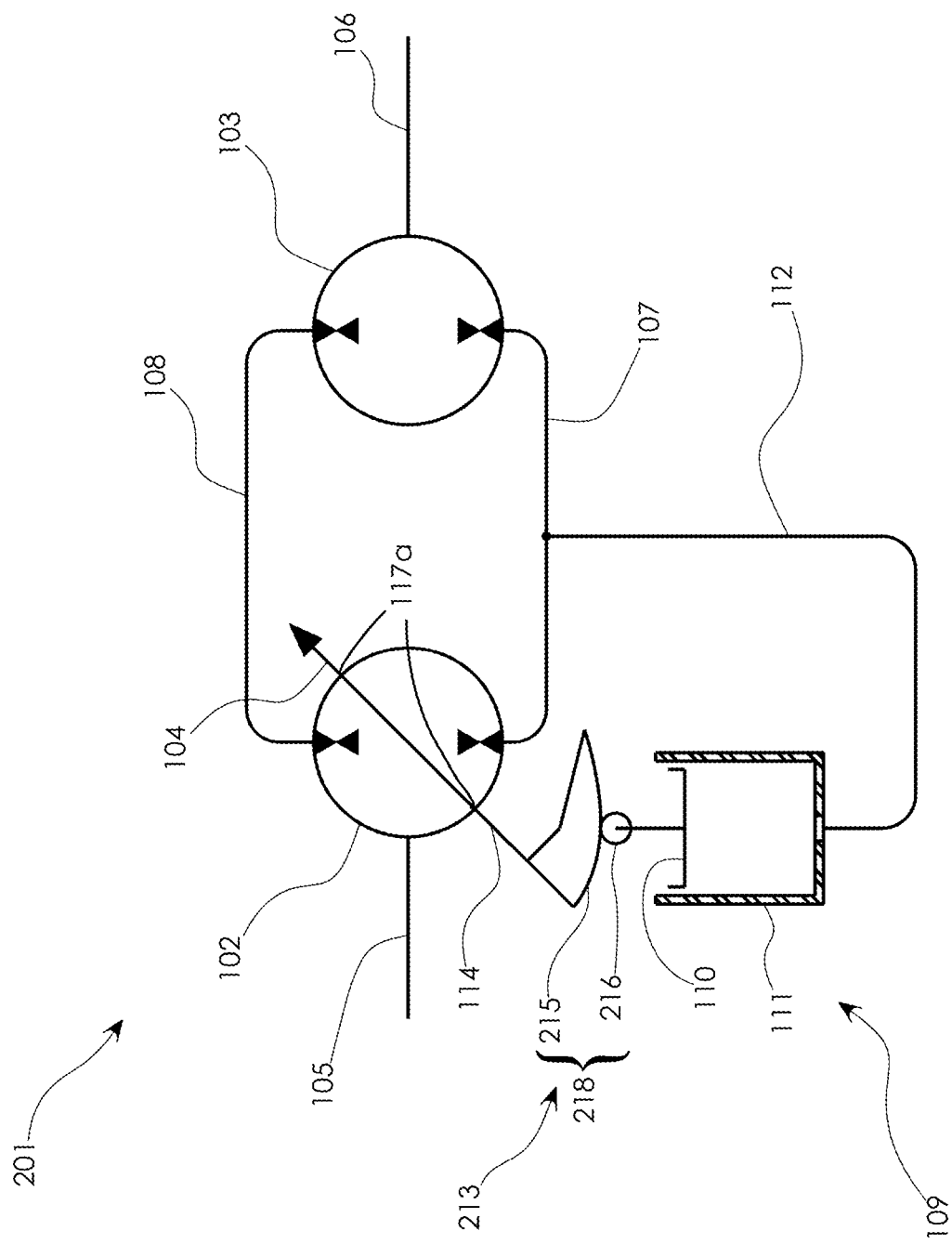
FIG. 4 is a schematic of a hydrostatic drive system of the invention which is similar to that of FIG. 2 but employs an alternative linkage assembly.

In alternative embodiments, a mechanical linkage apparatus consisting of a more complex multi-bar linkage, a cam or eccentric mechanism 218, a screw mechanism, and/or other like mechanisms might be considered. One such alternative embodiment of a hydrostatic drive system 201 is illustrated in the schematic of FIG. 4. (In FIG. 4, like numerals have been used to identify elements common to those in FIG. 2.) Here, linkage apparatus 213 employs cam 215 and follower 216 arrangement instead of push-pull rod 115 shown in FIG. 2 to adjust piston 110 in the Helmholtz resonator (i.e. the variable element in variable damping device 109).

Figure 9:
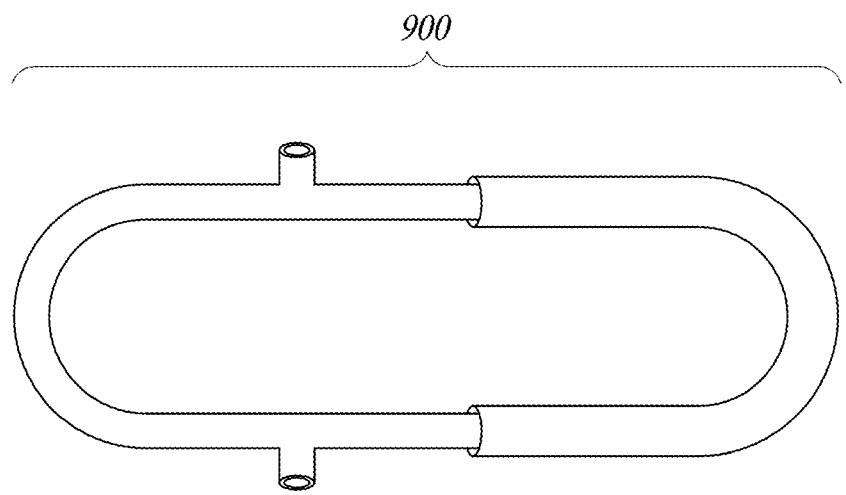
FIG. 9 shows a schematic diagram of a Quincke tube of an alternative embodiment of a hydrostatic drive system of the invention.

In yet further embodiments, the attenuating frequency of a Helmholtz resonator 116 might be varied by controlling the length of its neck (i.e. the variable element then is the neck). In such an embodiment, the linkage apparatus could instead be connected to the variable length neck 118 (FIG. 3) on the Helmholtz resonator 116. In still further embodiments, the variable damping device employed could alternatively be a coaxial chamber resonator, a Quincke tube 900 (FIG. 9) or any other suitable damping device which has at least one variable element that could be appropriately connected to the aforementioned linkages and/or other suitable linkages.

In yet further embodiments, the hydrostatic drive system may be of an open loop design having only a first fluid line (i.e. absent a second fluid line) in which the first and second hydraulic drive units are connected to a common reservoir. Alternatively, the hydrostatic drive system may be of an open loop design having only a first fluid line in which the first hydraulic drive unit is connected to a first reservoir and the second hydraulic drive unit is connected to a second reservoir.

Although the mechanical linkage apparatuses discussed above allow for simple and robust control of the instant hydrostatic drive systems, if the environment is not too harsh and more flexibility is required to control the attenuation frequency of the variable damping device, an electronic method may be used in lieu of such mechanical methods. For instance, an exemplary linkage apparatus may instead comprise a position sensor 1101a, 1101b (FIG. 11) installed on the variable first hydrostatic unit to monitor displacement. The position sensor may then be connected to a controller 1103 (FIG. 11), which in turn is connected to an actuator 1104 (FIG. 11) for changing the variable element (e.g., variable neck 108) of the variable damping device (e.g., 109).

Figure 5:
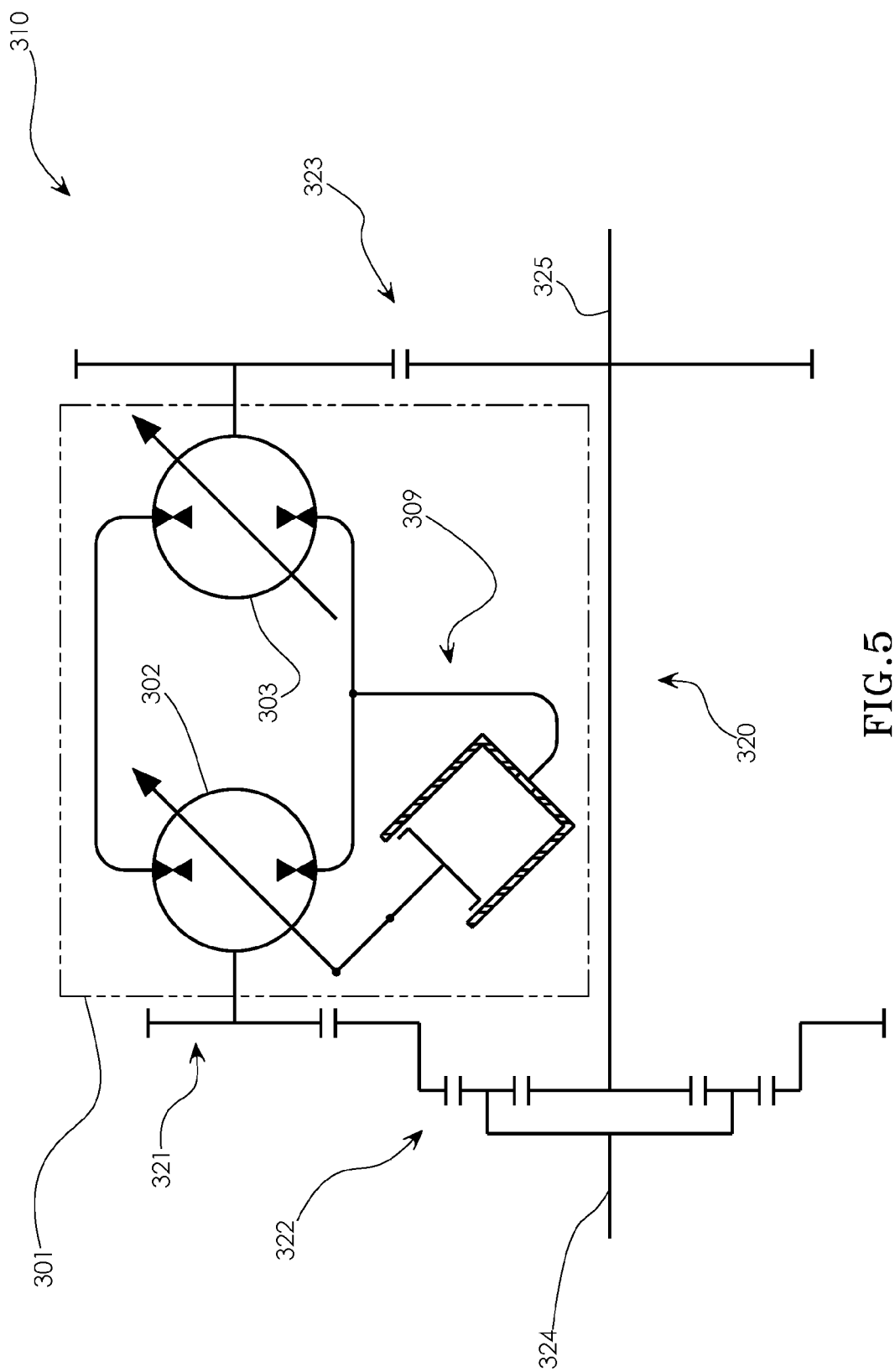
FIG. 5 shows a schematic of a simple power split, hydro mechanical IVT (HMIVT) which incorporates the inventive hydrostatic drive system of FIG. 2.

The hydrostatic drive systems of the invention are suitable for use in various types of transmissions, including a CVT, an IVT, or more complex split power transmissions. FIG. 5 shows hydrostatic drive system 301 similar to that of FIG. 2 which has been integrated into a simple split path IVT 310. In FIG. 5 however, both the first and second hydraulic drive units 302, 303 respectively of hydrostatic drive system 301 are shown as being of the variable type, but only first hydraulic drive unit 302 is connected to variable damping device 309. As shown in FIG. 5, HMIVT 310 also comprises conventional elements for such transmissions arranged in a typical fashion. HMIVT 310 has both mechanical branch 320 and hydraulic branch 321 in which hydrostatic drive system 301 appears. HMVIT 310 also includes power splitter 322 (shown as a planetary gearset), combiner gearset 323, input shaft 324, and output shaft 325.

In yet further embodiments of the invention, the second hydraulic drive unit can also be a variable displacement type of hydraulic drive unit comprising a second displacement control. The hydrostatic drive system may then additionally comprise a second linkage apparatus between the displacement control of the second hydraulic drive unit and the variable element of the variable damping device. A summation device can be located between the first and second linkages and the variable element of the variable damping device. Such a summation device is used to vary the effect that each of the first and second linkage apparatus have on the variable element. Thus, the first variable element would be connected through the summation device to an appropriate linkage apparatus which in turn is connected to the first hydraulic drive unit and the first variable element would also be connected through the summation device to the second linkage apparatus which is connected to the second hydraulic drive unit. The summation device operates to combine the outputs of the first and second linkage apparatus to the first variable element.

Figure 6:
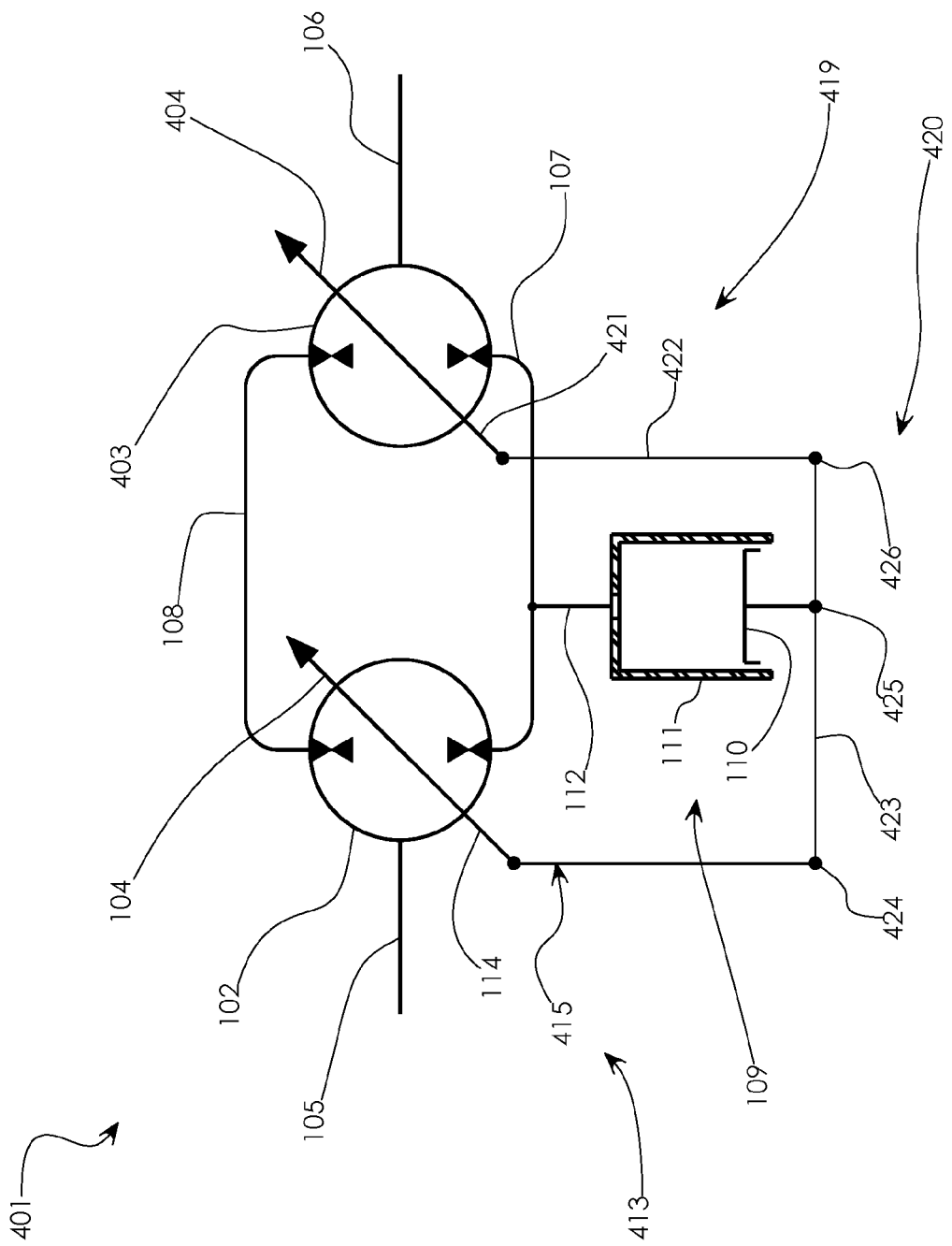
FIG. 6 shows a schematic of a hydrostatic drive system of the invention comprising an optional second displacement control, second linkage apparatus, and summation device.

An exemplary embodiment of this is shown in the schematic of hydrostatic drive system 401 shown in FIG. 6. (In FIG. 6, like numerals have again been used to identify elements common to those in FIG. 2.) Here, second hydraulic drive unit 403 is of the variable type with second displacement control 404 for controlling the displacement of unit 403. Also here, hydrostatic drive system 401 comprises first linkage apparatus 413 and second linkage apparatus 419 with summation device 420 connected therebetween. First linkage apparatus 413 includes lever arm 114 (attached to displacement control 104) and push-pull rod 415. Second linkage apparatus 419 includes lever arm 421 (attached to displacement control 404) and push-pull rod 422. As shown here, summation device 420 consists of beam 423 with first, second, and third pivot points 424, 425, and 426 respectively. First linkage apparatus 413 is connected to first pivot point 424. Second linkage apparatus 419 is connected to third pivot point 426. The input to the variable element (piston 110) of variable damping device 109 is connected to the remaining second pivot point 425.

Other summation devices may consist of a first and second cam connected to the first and second displacement controls with a follower attached to the variable element.

Figure 11:
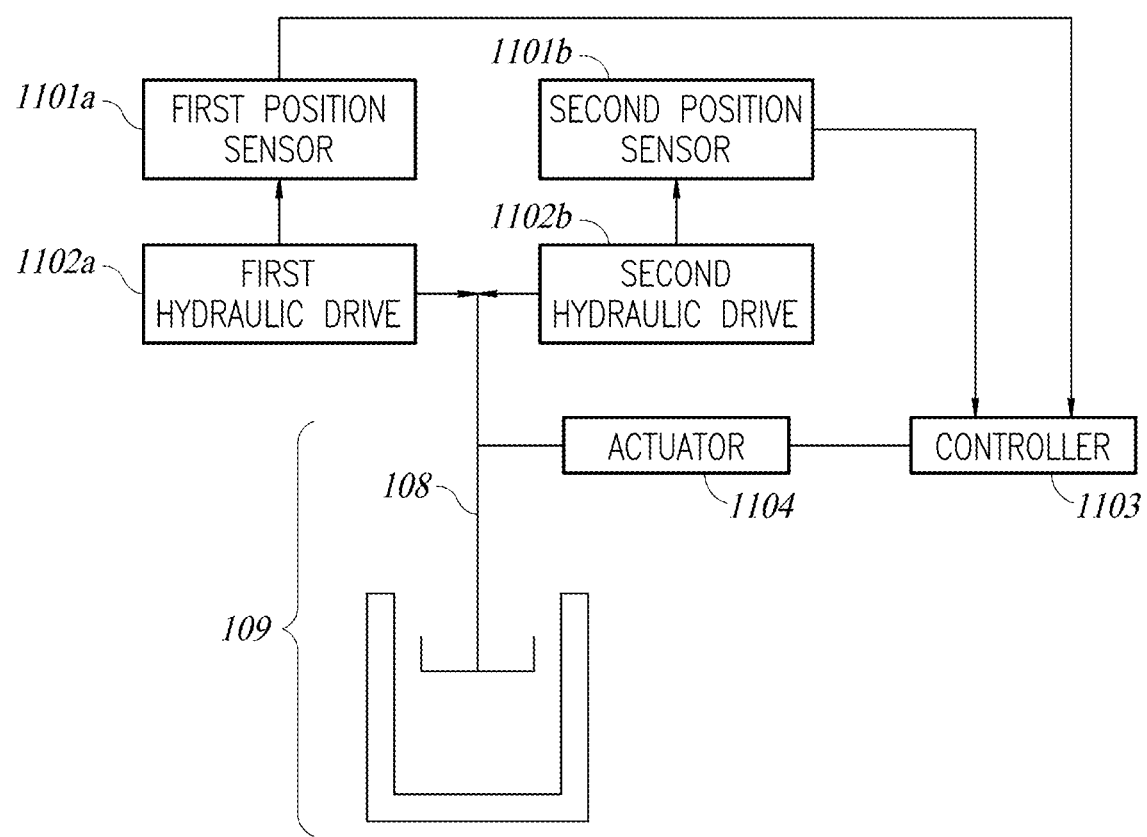
FIG. 11 shows a schematic diagram of first and second position sensors, installed on variable first and second hydraulic drive units to monitor displacement, the position sensors connected to a controller, which in turn is connected to an actuator to control a variable element (e.g., variable length neck) of a variable damping device of an embodiment of a hydrostatic drive system of the invention.

The mechanical linkage apparatus discussed above allow for simple and robust control of the instant hydrostatic drive systems. However, if the environment is not too harsh and more flexibility is required to control the attenuation frequency of the variable damping device, an electronic method may be used in lieu of such mechanical methods. For instance, an exemplary linkage apparatus as shown in FIG. 11 may instead comprise a first and second position sensor 1101a, 1101b installed on the variable first and second hydraulic drive units 1102a, 1102b to monitor displacement. The position sensors 1101a, 1101b may then be connected to a controller 1103, which in turn is connected to an actuator 1104 for controlling the variable element (e.g., moveable piston 110, variable length neck 118) of the variable damping device 109.

In still yet further embodiments of the invention, the variable damping device may comprise a second variable element providing for variation in the attenuation frequency of the variable damping device (e.g. two variable elements). In such an instance, the hydrostatic drive system can then additionally comprise a second linkage apparatus between the second displacement control of the second hydraulic drive unit and the second variable element of the variable damping device. Thus, the first variable element would be connected through an appropriate linkage apparatus to the first hydraulic drive unit and the second variable element would be connected through the second linkage apparatus to the second hydraulic drive unit. In addition, the first and second linkage apparatuses may also be interconnected to each other.

The mechanical linkage apparatus discussed above allows for simple and robust control of the instant hydrostatic drive systems. However, if the environment is not too harsh and more flexibility is required to control the attenuation frequency of the variable damping device, an electronic method may be used in lieu of such mechanical methods. For instance, an exemplary linkage apparatus may instead comprise a first and second position sensor installed on the variable first and second hydraulic drive units to monitor displacement. The position sensors may then be connected to a controller, which in turn is connected to a first and second actuator for controlling the first and second variable elements respectively of the variable damping device.

An alternate embodiment is also possible where the variable damping device is connected directly to one of the hydraulic drive units in fluid communication with the valve plate.

Figure 7:
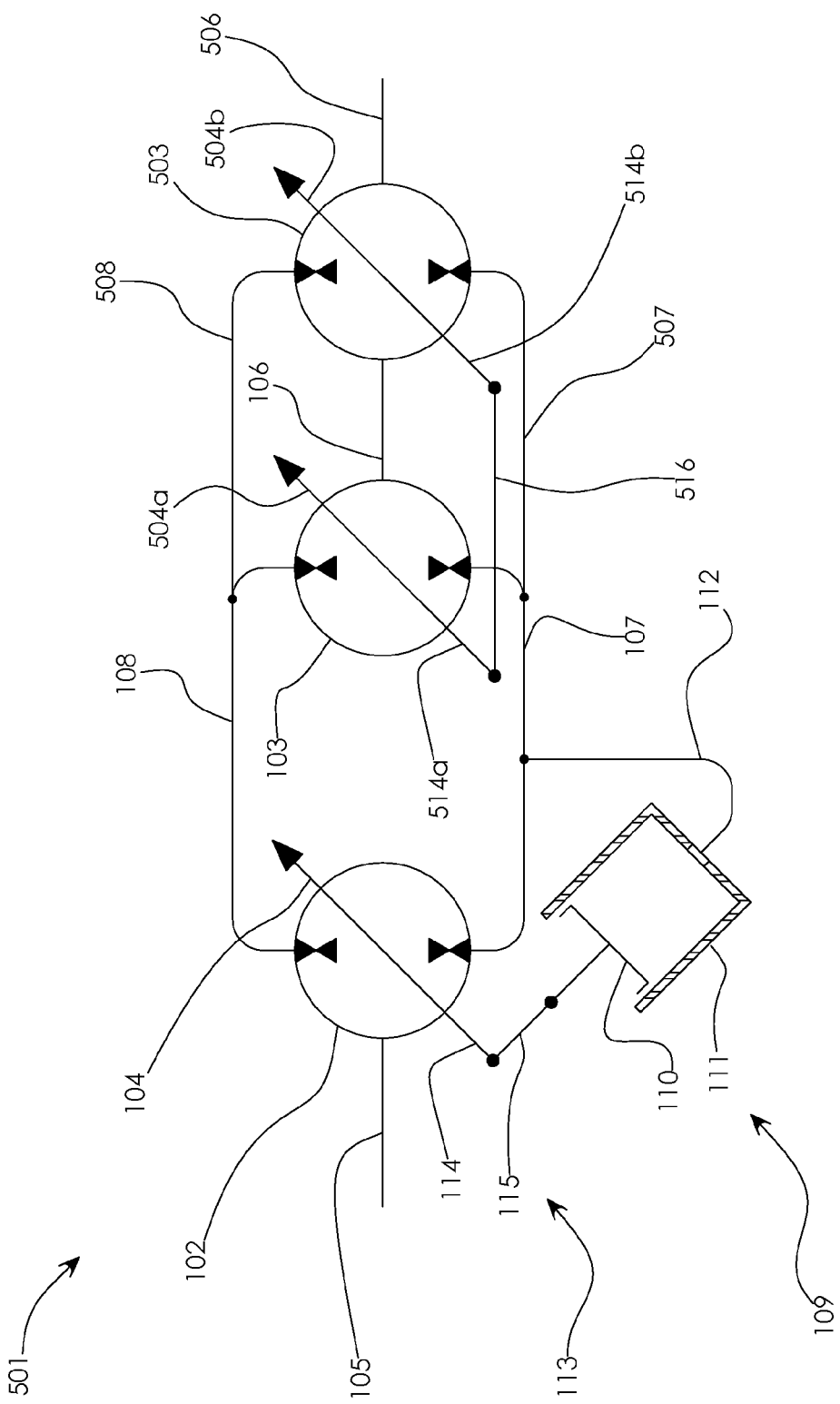
FIG. 7 shows a schematic of a hydrostatic drive system of the invention comprising an optional third hydraulic drive unit.

In yet further embodiments of the invention, a third hydraulic drive unit 503 may be added as shown in FIG. 7. Here, third hydraulic drive unit 503 is fluidly connected to first and second hydraulic drive units 102 and 103 with fluid lines 507 and 508. Second drive shaft 106 is mechanically coupled to third drive shaft 506 through third hydraulic drive unit 503. In an alternative embodiment, drive shafts 106 and 506 may be coupled together by gearing or by other means known in the art. In yet another alternative embodiment, second drive shaft 106 and third drive shaft 506 may not be mechanically coupled at all.

Displacement control 504a of hydraulic drive unit 103 is connected to displacement control 504b of hydraulic drive unit 503 such that displacement changes are synchronized between second hydraulic drive unit 103 and third hydraulic drive unit 503. As shown in FIG. 7, the connection between the two displacement controls 504a and 504b is made with lever arms 514a and 514b and linkage 516. In the instance where hydraulic drive unit 103 and hydraulic drive unit 503 are bent axis units, linkage 516 and lever arms 514a and 514b could be eliminated by using a common yoke as described in EP 3017215. Similarly, linkage 516 and lever arms 514a and 514b could be eliminated in the instance that a common lens plate is used. In the instance where hydraulic drive unit 103 and hydraulic drive unit 503 are axial piston hydrostatic units, a common swashplate would eliminate the need for linkage 516 and lever arms 514a and 514b. In the instance where hydraulic drive unit 103 and hydraulic drive unit 503 are radial piston hydrostatic units, a common eccentric displacement control ring would eliminate the need for linkage 516 and lever arms 514a and 514b. In an alternative embodiment, the displacement controls 504a and 504b are not connected at all and can be independently controlled. In yet another alternative embodiment, one or both of hydraulic drive units 103 and 503 may be of a fixed displacement design.

Variable damping device 109 is connected to displacement control 104 of first hydraulic drive unit 102 by mechanical linkage apparatus 113.

Again, in alternative embodiments, a mechanical linkage apparatus consisting of a more complex multi-bar linkage, a cam or eccentric mechanism, a screw mechanism, and/or other like mechanisms might be considered.

In further alternative embodiments, the displacements of second and third hydraulic drive units could also be connected to the variable damping device in a similar approach as that shown in FIG. 6.

As before, the mechanical linkage apparatus discussed above allows for simple and robust control of the instant hydrostatic drive systems. However, if the environment is not too harsh and more flexibility is required to control the attenuation frequency of the variable damping device, an electronic method may be used in lieu of such mechanical methods. For instance, an exemplary linkage apparatus may instead comprise a first and second and third position sensor installed on the variable first second and third hydraulic drive units to monitor displacement. The position sensors may then be connected to a controller, which in turn is connected to an actuator for controlling the variable element of the variable damping device.

Figure 8:
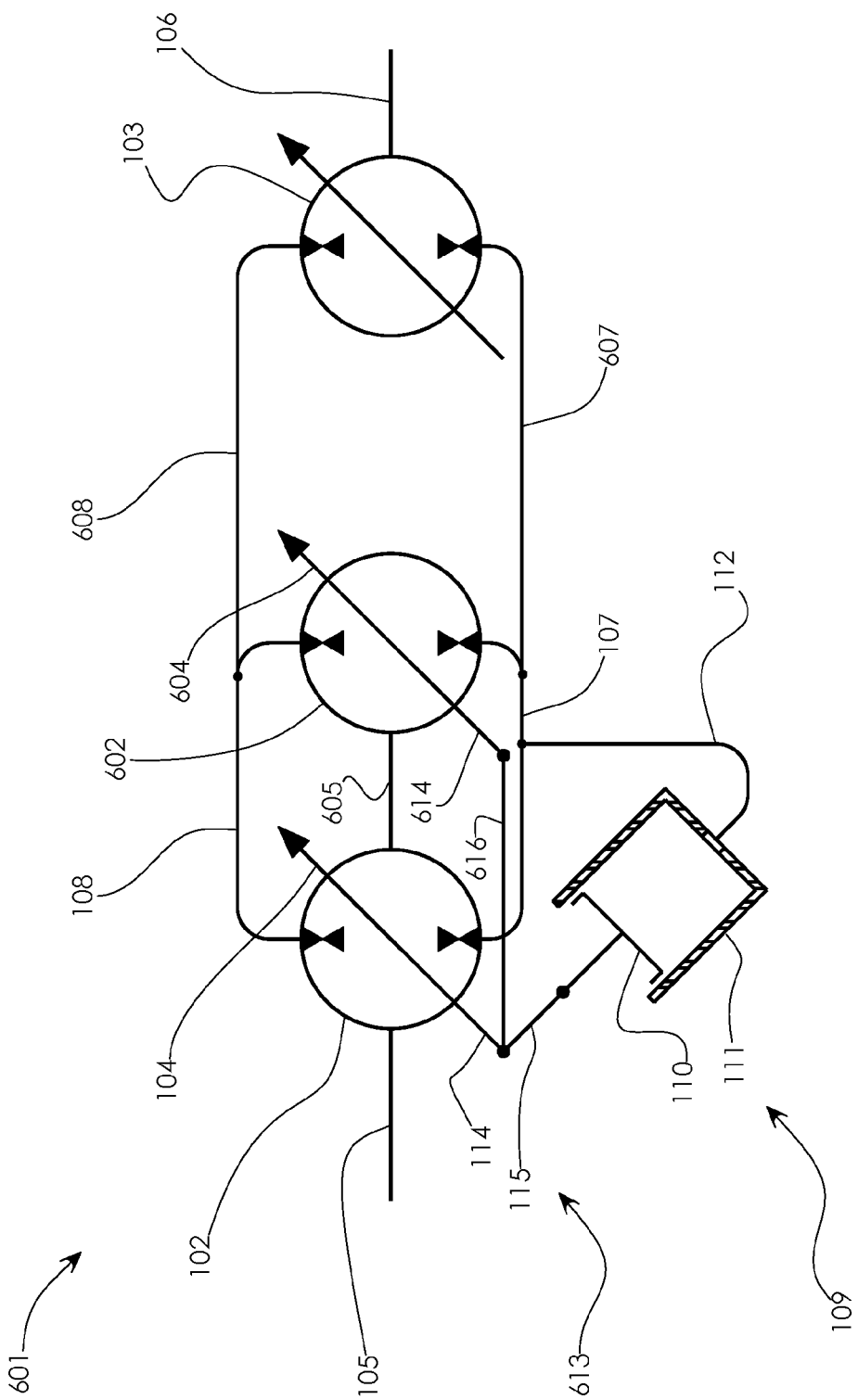
FIG. 8 shows a schematic of an alternative embodiment of a hydrostatic drive system of the invention comprising an optional third hydraulic drive unit.

In yet further embodiments of the invention, a third hydraulic drive unit may be added as shown in FIG. 8. Here, the third hydraulic drive unit 602 is fluidly connected to first and second hydraulic drive units 102 and 103 with fluid lines 607 and 608. Third drive shaft 605 is mechanically coupled to first drive shaft 105 through first hydraulic drive unit 102. In an alternative embodiment, drive shafts 105 and 605 may be coupled together by gearing or other means known in the art. Variable damping device 109 is connected to the displacement control of first and third hydraulic drive units 102 and 602 respectively with a simple mechanical linkage apparatus 613.

Displacement control 104 of hydraulic drive unit 102 is connected to displacement control 604 of hydraulic drive unit 602 such that displacement changes are synchronized between first hydraulic drive unit 102 and third hydraulic drive unit 602. As shown in FIG. 8, the connection between the two displacement controls 104 and 604 is made with lever arms 114 and 614 and linkage 616. In the instance where hydraulic drive unit 102 and hydraulic drive unit 602 are bent axis units, linkage 616 and lever arm 614 could be eliminated by using a common yoke as described in EP 3017215 and by connecting lever arm 114 to the common yoke. Similarly, linkage 616 and lever arm 614 could be eliminated in the instance that a common lens plate is used. In the instance where hydraulic drive unit 102 and hydraulic drive unit 602 are axial piston hydrostatic units, a common swashplate would eliminate the need for linkage 616 and lever arm 614. In the instance where hydraulic drive unit 102 and hydraulic drive unit 602 are radial piston hydrostatic units, a common eccentric displacement control ring would eliminate the need for linkage 616 and lever arm 614.

Again in alternative embodiments, a mechanical linkage apparatus consisting of a more complex multi-bar linkage, a cam or eccentric mechanism, a screw mechanism, and/or other like mechanisms might be considered.

In further alternative embodiments, the displacements of the third hydraulic drive unit could also be connected to the variable damping device in a similar approach as that shown in FIG. 6.

As before, the mechanical linkage apparatus discussed above allows for simple and robust control of the instant hydrostatic drive systems. However, if the environment is not too harsh and more flexibility is required to control the attenuation frequency of the variable damping device, an electronic method may be used in lieu of such mechanical methods. For instance, an exemplary linkage apparatus may instead comprise a first and second position sensor installed on the variable first and second hydraulic drive units to monitor displacement. A third position sensor may be installed on the third variable hydraulic drive unit if a mechanical mechanism is not used to synchronize the displacements between first and third variable hydraulic drive units. The position sensors may then be connected to a controller, which in turn is connected to an actuator for controlling the variable element of the variable damping device.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:
1. A hydrostatic drive system comprising:
  a first hydraulic drive wherein the first hydraulic drive is a variable displacement hydraulic drive comprising a first displacement control coupled to control a displacement of the first hydraulic drive;
  a second hydraulic drive;
  a first drive shaft connected to the first hydraulic drive;
  a second drive shaft connected to the second hydraulic drive;
  a first fluid line fluidly connecting the first hydraulic drive to the second hydraulic drive;
  a variable damping device connected to the first fluid line and fluidly connected to the first and second hydraulic drives, wherein the variable damping device comprises at least one variable element that provides a variation in an attenuation frequency of the variable damping device; and
  a first linkage between the first displacement control of the first hydraulic drive and the variable element of the variable damping device and operable to control the variable element in accordance with the displacement of the first displacement control.

2. The hydrostatic drive system of claim 1 wherein the first hydraulic drive is a pump and the second hydraulic drive is a motor.

3. The hydrostatic drive system of claim 1 wherein the first hydraulic drive is a motor and the second hydraulic drive is a pump.

4. The hydrostatic drive system of claim 1 wherein the variable damping device is a Helmholtz resonator.

5. The hydrostatic drive system of claim 4 wherein the variable element is a piston forming an end of the Helmholtz resonator, whereby a volume of the Helmholtz resonator changes with the displacement of the piston.

6. The hydrostatic drive system of claim 4 wherein the variable element is a variable length neck on the Helmholtz resonator, whereby a volume of the Helmholtz resonator changes with the displacement of the neck.

7. The hydrostatic drive system of claim 1 wherein the variable damping device is a Quincke tube.

8. The hydrostatic drive system of claim 1 wherein the first linkage is a mechanical linkage linking the first displacement control of the first hydraulic drive to the variable element of the variable damping device.

9. The hydrostatic drive system of claim 8 wherein the variable damping device is a Helmholtz resonator and the variable element is a piston forming an end of the Helmholtz resonator, and the mechanical apparatus comprises:
 a lever arm attached to the first displacement control of the first hydraulic drive; and
 a push-pull rod attached to the piston of the Helmholtz resonator.

10. The hydrostatic drive system of claim 9 wherein the first hydraulic drive is a bent axis hydraulic drive comprising a yoke and the lever arm is attached to the yoke of the bent axis hydraulic drive.

11. The hydrostatic drive system of claim 9 wherein the first hydraulic drive is a bent axis hydraulic drive comprising a sector plate and the lever arm is attached to the sector plate of the bent axis hydraulic drive.

12. The hydrostatic drive system of claim 9 wherein the first hydraulic drive is an axial piston hydraulic drive and the lever arm is attached to a swash plate of the axial piston hydraulic drive.

13. The hydrostatic drive system of claim 9 wherein the first hydraulic drive is a radial piston motor and the lever arm is attached to an eccentric displacement control ring of the radial piston motor.

14. The hydrostatic drive system of claim 8 wherein the mechanical apparatus comprises a multi-bar linkage, a cam mechanism, or an eccentric mechanism.

15. The hydrostatic drive system of claim 8 wherein the variable damping device is a Helmholtz resonator and the variable element is a variable length neck on the Helmholtz resonator, and the mechanical apparatus comprises:
 a lever arm attached to the first displacement control of the first hydraulic drive; and
 a push-pull rod attached to the neck of the Helmholtz resonator.

16. The hydrostatic drive system of claim 1 wherein the first linkage apparatus comprises a position sensor attached to the first displacement control of the first hydraulic drive, an actuator connected to the variable element of the variable damping device, and a controller wherein the controller input is connected to the position sensor and the controller output is connected to the actuator.

17. The hydrostatic drive system of claim 1 wherein the second hydraulic drive is a variable displacement hydraulic drive comprising a second displacement control.

18. The hydrostatic drive system of claim 17 additionally comprising:
 a second linkage between the second displacement control of the second hydraulic drive and the variable element of the variable damping device and operable to control the variable element in accordance with the displacement of the second displacement control; and
 a summation device connected to the first linkage and second linkage and operable to vary the effect of the first linkage and second linkage on the variable element.

19. The hydrostatic drive system of claim 17 wherein the variable damping device comprises an additional variable element that provides a variation in the attenuation frequency of the variable damping device and the hydrostatic drive system additionally comprises a second linkage between the second displacement control of the second hydraulic drive and the additional variable element of the variable damping device.

20. The hydrostatic drive system of claim 19 wherein the first linkage and second linkage are interconnected.

21. The hydrostatic drive system of claim 1 comprising a second fluid line fluidly connecting the first hydraulic drive to the second hydraulic drive.

22. A power split infinitely variable transmission comprising the hydrostatic drive system of claim 1.

23. A continuously variable transmission comprising the hydrostatic drive system of claim 1.

24. A method for attenuating vibration in a hydrostatic drive system, the hydrostatic drive system comprising:
 a first hydraulic drive wherein the first hydraulic drive is a variable displacement hydraulic drive;
 a second hydraulic drive;
 a first drive shaft connected to the first hydraulic drive;
 a second drive shaft connected to the second hydraulic drive;
 a first fluid line fluidly connecting the first hydraulic drive to the second hydraulic drive;
 a variable damping device connected to the first fluid line and fluidly connected to the first and second hydraulic drives, wherein the variable damping device comprises at least one variable element that provides variation in an attenuation frequency of the variable damping device,
the method comprising:
 incorporating a first displacement control that controls a displacement of the first hydraulic drive into the variable displacement first hydraulic drive;
 incorporating a first linkage between the first displacement control of the first hydraulic drive and the variable element of the variable damping device; and
 controlling the variable element in accordance with the displacement of the first displacement control.

* * * * *